United States Patent [19]
Jeong

[11] Patent Number: 5,959,686
[45] Date of Patent: Sep. 28, 1999

[54] APPARATUS AND METHOD FOR CONTROLLING SUB MONITORS IN A VIDEO COMMUNICATION SYSTEM

[75] Inventor: Seong-Gon Jeong, Suwon, Rep. of Korea

[73] Assignee: SamSung Electronics Co., Ltd., Suwon, Rep. of Korea

[21] Appl. No.: 08/923,096

[22] Filed: Sep. 4, 1997

[30] Foreign Application Priority Data

Sep. 4, 1996 [KR] Rep. of Korea ...................... 96/38307

[51] Int. Cl.[6] .......................... H04N 5/445; H04J 15/00; H04L 5/20; G06F 15/02
[52] U.S. Cl. .............................. 348/563; 345/1; 364/200; 395/200.02; 395/200.03; 395/200.4; 348/552
[58] Field of Search .................................. 348/460, 552, 348/563, 575, 705, 706, 722, 474; 386/52; 364/200, 431.11, 521; 395/200.3, 162, 750, 275, 200.02, 200.03, 200.04; 345/1, 2, 132; H04N 5/445; H04J 15/00; H04L 5/20

[56] References Cited

U.S. PATENT DOCUMENTS

| 4,051,522 | 9/1977 | Healy ....................................... 358/86 |
| 4,356,475 | 10/1982 | Neumann ............................... 340/521 |
| 4,434,460 | 2/1984 | Drakenborn ........................... 364/200 |
| 4,991,121 | 2/1991 | Minoura ................................. 364/521 |
| 5,315,711 | 5/1994 | Barone et al. ........................... 395/275 |

*Primary Examiner*—John K. Peng
*Assistant Examiner*—Wesner Sajous
*Attorney, Agent, or Firm*—Robert E. Bushnell, Esq.

[57] ABSTRACT

An apparatus and a method for controlling a plurality of sub monitors in a video communication system in which the same signal from a host computer or a video tape recording/reproducing device is displayed on screens of the sub monitors and a main monitor to which the sub monitors are connected in series. The main monitor generates control data in response to an external sub monitor control signal to set up a desired one of the sub monitors. A plurality of communication devices are included respectively in the sub monitors, for serially transferring the control data from the main monitor to the sub monitors and response data from the sub monitors to the main monitor. A plurality of microcomputers are connected respectively to the communication devices, for setting up a corresponding one of the sub monitors in response to the control data from the main monitor when the control data from the main monitor is for the control of the corresponding sub monitor and transferring the control data from the main monitor to the subsequent sub monitor when the control data from the main monitor is not for the control of the corresponding sub monitor. According to the present invention, the main monitor can control the plurality of sub monitors using the communication devices therein and a program for the control thereof.

12 Claims, 7 Drawing Sheets

Fig. 7

| COLOR CONTROL | GENERAL CONTROL | AUDIO CONTROL | POWER CONTROL |
|---|---|---|---|
| DEGAUSING<br>SIDE-PIN<br>TRAP<br>PARA<br>H-PHASE<br>V-LIN<br>V-CENTER<br>H-SIZE<br>S-CORRECT | R-GAIN<br>G-GAIN<br>B-GAIN<br>R-CUTOFF<br>G-CUTOFF<br>B-CUTOFF<br>CONTRAST<br>BRIGHT | MAIN-VR<br>BALANCE<br>BASS<br>TREBLE<br>MUTE | POWER-ON<br>POWER-OFF<br>POWER-STAND BY<br>POWER-SUSPEND | und
APPARATUS AND METHOD FOR CONTROLLING SUB MONITORS IN A VIDEO COMMUNICATION SYSTEM

CLAIM OF PRIORITY

This application makes reference to, incorporates the same herein, and claims all benefits accruing under 35 U.S.C §119 from an application entitled Apparatus And Method For Controlling Sub Monitors In Video Communication System earlier filed in the Korean Industrial Property Office on Sep. 4, 1996 and there duly assigned Ser. No. 96-38307 by that Office.

BACKGROUND OF THE INVENTION

1. Field of the Invention

The present invention relates in general to controlling monitors in a video communication system, and more particularly to an apparatus and a method for controlling a plurality of sub monitors in a video communication system, in which a host computer controls functions of the sub monitors using communication devices therein and a program for the control thereof.

2. Description of the Prior Art

Generally, a monitor is connected to a television receiver, a video tape recording/reproducing device or a host computer, for processing an output signal therefrom to display it on a screen thereof.

Connected to one monitor may be another monitor for sharing output data from the television receiver, video tape recording/reproducing device or host computer therewith.

In a conventional video communication system a host computer is connected to a main monitor, an output terminal of which is connected to an input terminal of a first sub monitor; an output terminal of the first sub monitor is connected to an input terminal of a second sub monitor, etc.; and an output terminal of the last sub monitor is connected to an input terminal of the main monitor. As a result, the same video signal from the host computer is displayed on the screens of all the main and sub monitors so that it can be viewed by the video communication system users. On the other hand, a video tape recording/reproducing device is not limited to use with only the main monitor, but it may be connected to any one of the main and sub monitors so that the same video signal therefrom can be displayed on the screens of all the main and sub monitors.

The sub monitors may be used in a conference place. When the conference place is large, conferees have a limitation in viewing data using an overhead projector. Further, a device with a large screen is high in cost. For these reasons, the use of personal sub monitors is advantageous when considering the size of the conference place and cost.

However, such video communication system has a disadvantage in that the sub monitor users control their sub monitors individually. Accordingly, it is necessary to provide a manager to manage the video communication system, and he/she will personally check and control many sub monitors. As a result, the video communication system is inconvenient to manage.

SUMMARY OF THE INVENTION

Therefore, the present invention has been made in view of the above problems, and it is an object of the present invention to provide an apparatus and a method for controlling a plurality of sub monitors in a video communication system, in which a main monitor controls functions of the sub monitors using communication devices therein and a program for the control thereof.

In accordance with one aspect of the present invention, there is provided an apparatus for controlling a plurality of sub monitors in a video communication system in which the same signal from a host computer or a video tape recording/ reproducing device is displayed on screens of the sub monitors and a main monitor to which the sub monitors are connected in series, comprising the main monitor generating control data in response to an external sub monitor control signal to set up a desired one of the sub monitors; a plurality of communication units included respectively in the sub monitors, for serially transferring the control data from the main monitor to the sub monitors and response data from the sub monitors to the main monitor; and a plurality of microcomputers connected respectively to the communication units, for setting up a corresponding one of the sub monitors in response to the control data from the main monitor when the control data from the main monitor is for the control of the corresponding sub monitor and transferring the control data from the main monitor to a subsequent sub monitor when the control data from the main monitor is not for the control of the corresponding sub monitor.

In accordance with another aspect of the present invention, there is provided a method for controlling a plurality of sub monitors in a video communication system in which the same signal from a host computer or a video tape recording/reproducing device is displayed on screens of the sub monitors and a main monitor to which the sub monitors are connected in series, comprising the first step of checking states of the sub monitors on the screen of the main monitor and transferring control data from the main monitor to a desired one of the sub monitors to control it; and the second step of selecting and setting up the desired sub monitor in response to the control data transferred at the first step.

BRIEF DESCRIPTION OF THE DRAWINGS

The above and other objects, features and advantages of the present invention will be more clearly understood from the following detailed description taken in conjunction with the accompanying drawings, in which:

FIG. 7 is a table illustrating control functions of the sub monitors in FIG. 6 in accordance with the principles of the present invention.

DETAILED DESCRIPTION OF THE PREFERRED EMBODIMENTS

Figure 1:
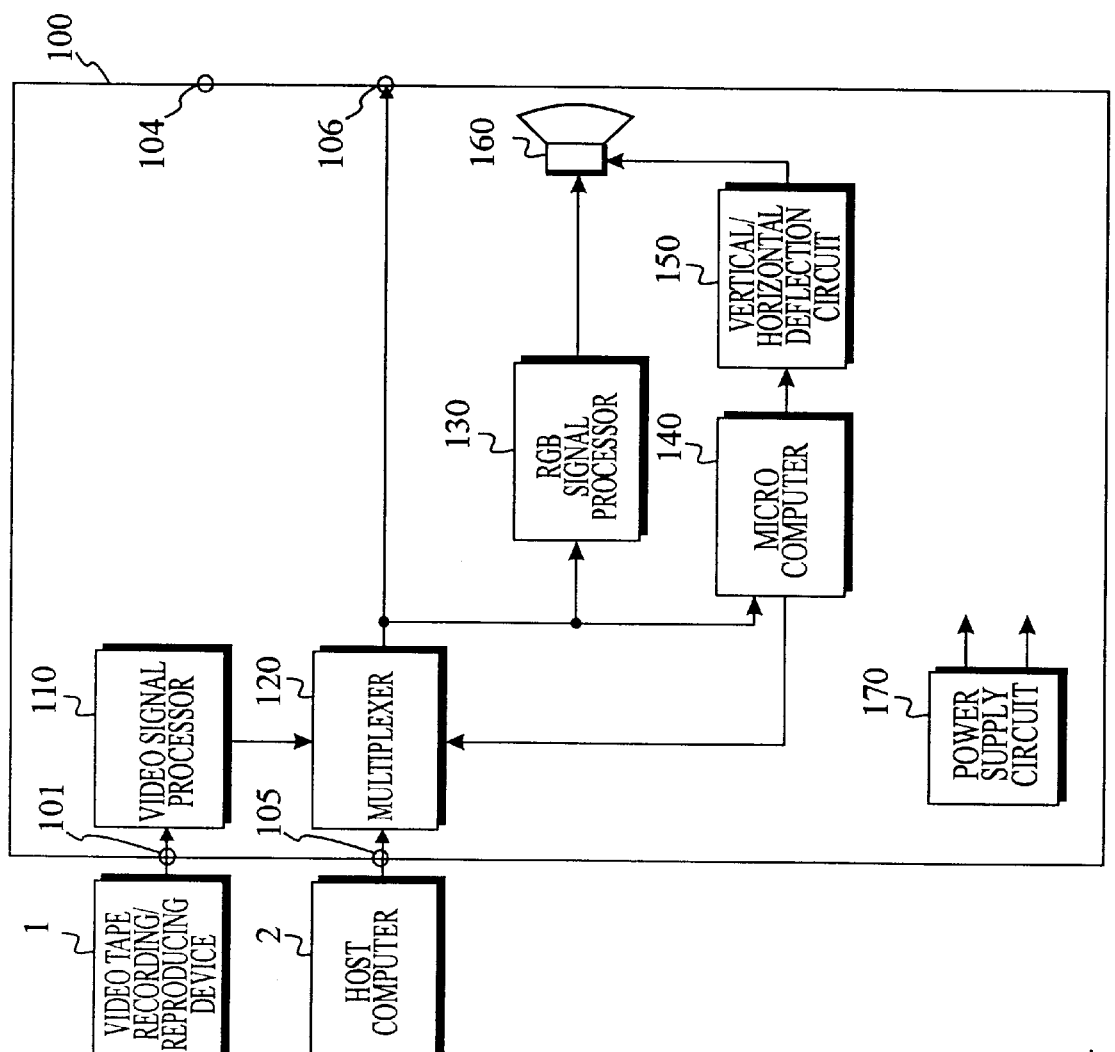
FIG. 1 is an exemplary block diagram illustrating the construction of a monitor in a video communication system.

FIG. 1 is an exemplary block diagram illustrating the construction of a monitor in a video communication system.

As shown in this drawing, the monitor comprises a video signal processor 110 for separating a video signal from a video tape recording/reproducing device 1 into red (R), green (G) and blue (B) signals and vertical and horizontal synchronous signals, a multiplexer 120 for selecting an output signal from video signal processor 110 or an output signal from a host computer 2, an RGB signal processor 130 for processing the RGB signals from multiplexer 120 to scan them on a cathode ray tube (CRT) 160, a microcomputer 140 for controlling the monitor system in response to the vertical and horizontal synchronous signals from multiplexer 120, a vertical/horizontal deflection circuit 150 for adjusting vertical and horizontal values of the monitor in response to control signals from microcomputer 140, and a power supply circuit 170 for converting an external input alternating current (AC) voltage into direct current (DC) voltages of various levels and supplying the converted DC voltages to the components in the monitor.

The operation of the monitor with the above-mentioned construction will hereinafter be described.

Video signal processor 110 separates the video signal from video tape recording/reproducing device 1 into the R, G and B signals and the vertical and horizontal synchronous signals, which are then applied to multiplexer 120. Multiplexer 120 also receives the output signal from host computer 2 through a monitor input terminal 105. Then, multiplexer 120 selects the output signal from video signal processor 110 or the output signal from host computer 2. The RGB signals from multiplexer 120 are processed by the RGB signal processor 130 to be scanned on CRT 160. Microcomputer 140 recognizes a monitor mode in response to the vertical and horizontal synchronous signals from multiplexer 120 and outputs the control signals based on the recognized monitor mode to vertical/horizontal deflection circuit 150. As a result, vertical/horizontal deflection circuit 150 adjusts horizontal position and size, vertical position and size, a side cushion and a tilt of the monitor in response to the control signals from microcomputer 140.

The output signal from multiplexer 120 is also transferred to an input terminal of another monitor through a monitor output terminal 106. As a result, the same video signal can be displayed on screens of the separate monitors. Power supply circuit 170 converts the external input AC voltage into DC voltages of various levels necessary to the monitor and supplies the converted DC voltages to the monitor.

Figure 2:
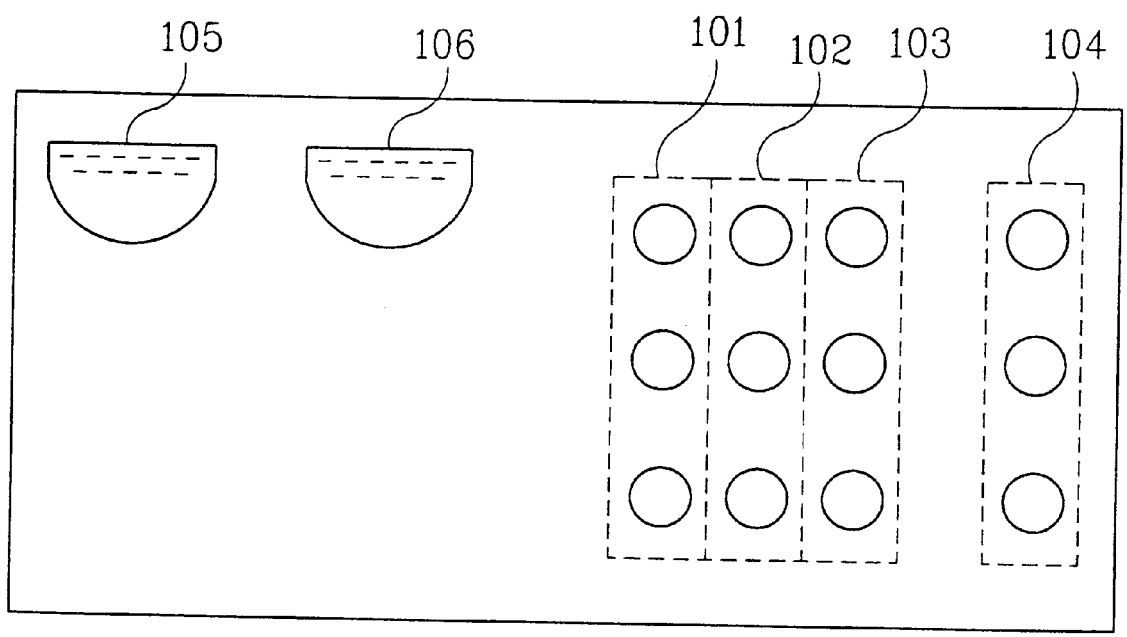
FIG. 2 is a rear view of the monitor in FIG. 1.

FIG. 2 is a rear view of the monitor in FIG. 1. As shown in this drawing, the monitor comprises a plurality of sets of input terminals 101–103, each of which is connected to the video tape recording/reproducing device 1 or a game machine, and a set of output terminals 104 for transferring output signals from the video tape recording/reproducing device 1 or game machine to another monitor. Each of the input and output terminal sets 101–104 has three terminals for inputting or outputting video, audio right channel and audio left channel signals. The monitor further comprises a monitor input terminal 105 connected to host computer 2, and monitor output terminal 106 for transferring the output signal from host computer 2 to another monitor.

Noticeably, a desired number of sub monitors can be connected in series to a main monitor by using the input and output terminals as shown in FIG. 2. As a result, the same video signal from video tape recording/reproducing device 1 or host computer 2 can be displayed on the screens of each sub monitor.

The sub monitors may be used in a conference place. When the conference place is large, conferees have a limitation in viewing data using an overhead projector. Further, a device with a large screen is high in cost. For these reasons, the use of personal sub monitors is advantageous in view of the size of the conference place and cost.

However, the above-mentioned video communication system has a disadvantage in that the sub monitor users control their sub monitors individually. Alternatively, provided that a manager is present to manage the video communication system, he/she will personally check and control many sub monitors. As a result, the foregoing video communication system may be inconvenient to manage.

Figure 3:
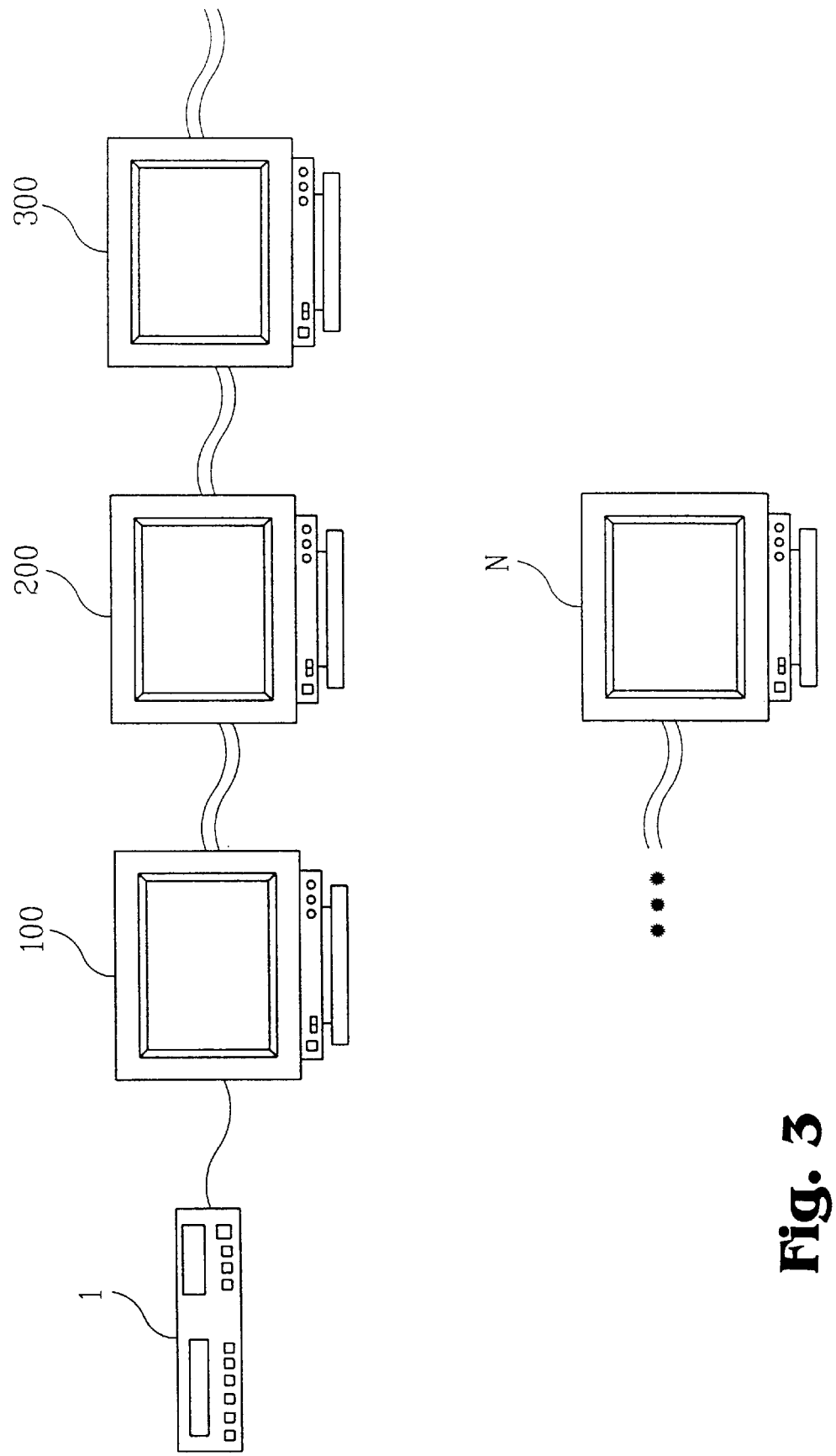
FIG. 3 is a block diagram illustrating the construction of a video communication system to which the present invention is applied.

FIG. 3 is a block diagram illustrating the construction of a video communication system to which the present invention is applied. As shown in this drawing, a main monitor 100 is connected to a video tape recording/reproducing device 1, for processing an output signal therefrom to display it on a screen of main monitor 100. A plurality of sub monitors 200, 300, . . . , N are connected in series to main monitor 100 so that they can be set up in response to control data from main monitor 100. Alternatively, host computer 2 may be connected to any one of the main and sub monitors 100, 200, . . . , N so that the same video signal therefrom can be displayed on screens of all the main and sub monitors 100, 200, . . . , N.

Figure 4:
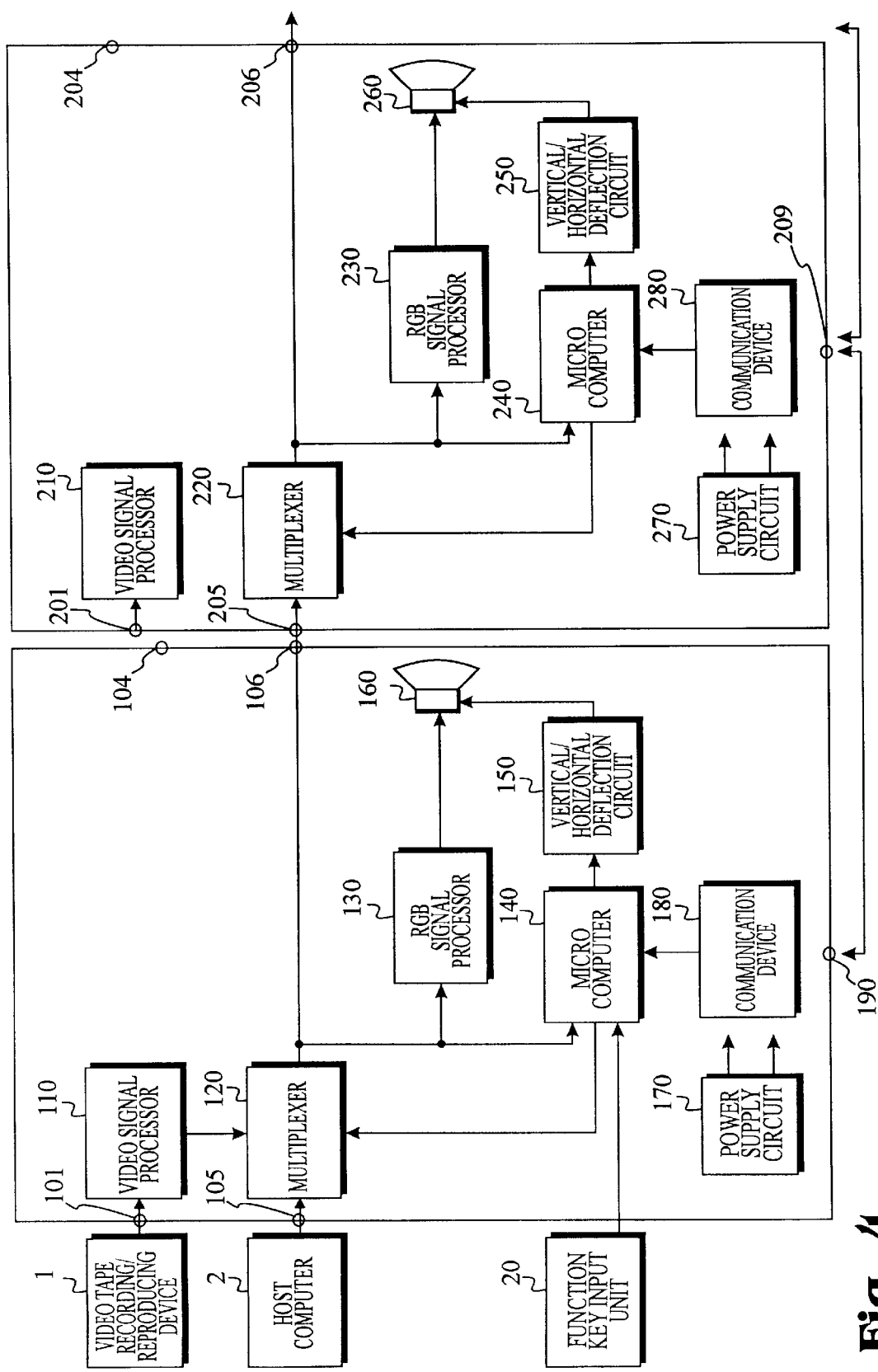
FIG. 4 is a block diagram illustrating the construction of main and sub monitors in FIG. 3 in accordance with the principles of the present invention.

FIG. 4 is a block diagram illustrating the construction of main and sub monitors 100 and 200 in FIG. 3 in accordance with the present invention. As shown in this drawing, main monitor 100 comprises a video signal processor 110 for separating a video signal from video tape recording/reproducing device 1 into R, G and B signals and vertical and horizontal synchronous signals, a multiplexer 120 for selecting an output signal from video signal processor 110 or an output signal from host computer 2 in response to a selection signal, an RGB signal processor 130 for processing the RGB signals from multiplexer 120 to scan them on a CRT 160, and a microcomputer 140 for outputting the selection signal to multiplexer 120. Also, microcomputer 140 recognizes a monitor mode in response to the vertical and horizontal synchronous signals from multiplexer 120 and outputs control signals based on the recognized monitor mode. Further, microcomputer 140 generates monitor set-up control data in response to a sub monitor control key signal from a function key input unit 20.

The main monitor 100 further comprises a vertical/horizontal deflection circuit 150 for adjusting vertical and horizontal values of main monitor 100 in response to the control signals from microcomputer 140, a communication device 180 for transferring the control data from microcomputer 140 to sub monitor 200 and response data from sub monitor 200 to microcomputer 140, and a power supply circuit 170 for converting an external input AC voltage into DC voltages of various levels and supplying the converted DC voltages to the components in main monitor 100.

In accordance with the preferred embodiment of the present invention, sub monitors 200, . . . , N are connected in series to main monitor 100 and the construction thereof is the same as that of main monitor 100.

Figure 5:
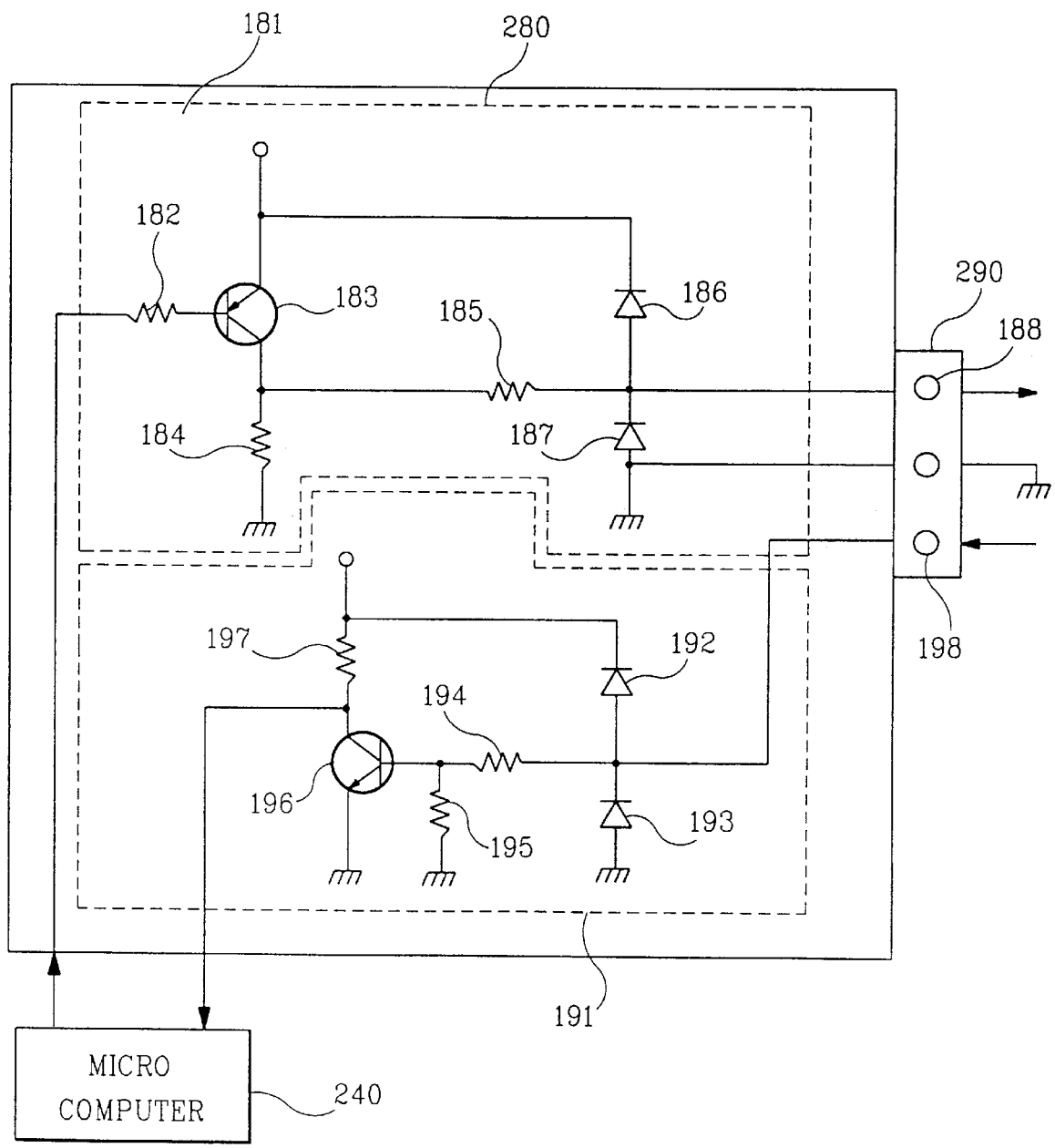
FIG. 5 is a detailed circuit diagram illustrating the construction of a communication device in FIG. 4 in accordance with the principles of the present invention.

FIG. 5 is a detailed circuit diagram illustrating the construction of communication device 280 in FIG. 4. Preferably, communication device 280 may be composed of a display communication management system (DCMS).

As shown in FIG. 5, communication device 280 includes a first buffer 181 for transferring the response data or control data from microcomputer 240 to main monitor 100 or sub monitor 300, and a second buffer 191 for transferring the control data from main monitor 100 or the response data from sub monitor 300 to microcomputer 240. A connector 290 has an output terminal 188 for transferring the response data or control data from first buffer 181 to main monitor 100 or sub monitor 300, and an input terminal 198 for transferring the control data from main monitor 100 or the response data from sub monitor 300 to second buffer 191.

The first buffer 181 includes a current amplification transistor 183, bias/transistor protection diodes 186 and 187 and resistors 182, 184 and 185. The resistor 182 has its one side connected to an output terminal of microcomputer 240, resistor 184 has its one side connected to a ground voltage terminal, and resistor 185 has its one side connected to output terminal 188 of connector 290. The current amplification transistor 183 has its base connected to the other side of resistor 182, its emitter connected to a supply voltage terminal of 5V and its collector connected in common to the other sides of resistors 184 and 185. The bias/transistor protection diode 186 has its anode connected to a connection point of resistor 185 and output terminal 188 of connector 290 and its cathode connected to a connection point of the supply voltage terminal and the emitter of transistor 183. The bias/transistor protection diode 187 has its anode connected to the ground voltage terminal and its cathode connected to the connection point of resistor 185 and output terminal 188 of connector 290.

The second buffer 182 includes a current amplification transistor 196, bias/transistor protection diodes 192 and 193 and resistors 194, 195 and 197. The resistor 197 has its one side connected to the supply voltage terminal, resistor 194 has its one side connected to input terminal 198 of connector 290, and resistor 195 has its one side connected to the ground voltage terminal. The current amplification transistor 196 has its base connected in common to the other sides of resistors 194 and 195, its emitter connected to the ground voltage terminal and its collector connected in common to the other side of resistor 197 and an input terminal of microcomputer 240. The bias/transistor protection diode 192 has its anode connected to a connection point of input terminal 198 of connector 290 and resistor 194 and its cathode connected to a connection point of the supply voltage terminal and the collector of transistor 196. The bias/transistor protection diode 193 has its anode connected to the ground voltage terminal and its cathode connected to the connection point of input terminal 198 of connector 290 and resistor 194.

The operation of the video communication system with the above-mentioned construction in accordance with the present invention will hereinafter be described in detail with reference to FIGS. 3 to 7.

Figure 6:
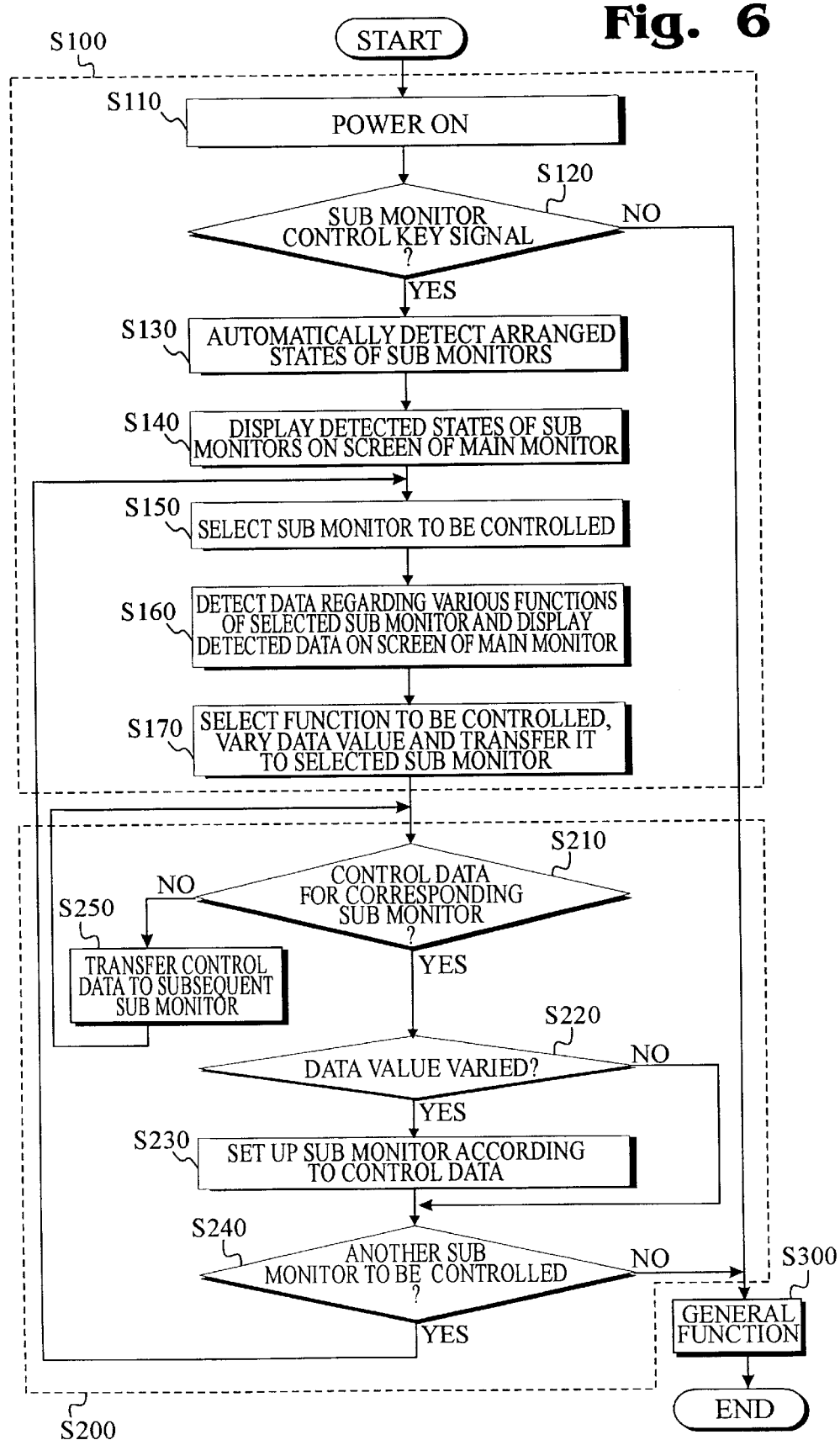
FIG. 6 is a flowchart illustrating a method for controlling a plurality of sub monitors in a video communication system using a main monitor in accordance with the principles of the present invention.

The communication device as shown in FIG. 5 and a monitor control program as shown in FIG. 6 are required for the communication between the main and sub monitors in the video communication system as shown in FIG. 3.

In FIG. 3, video tape recording/reproducing device 1 or host computer 2 is connected to main monitor 100 so that the same video signal therefrom can be displayed on the screens of sub monitors 200, . . . , N through main monitor 100.

To this end, in FIG. 4, multiplexer 120 selects the output signal from video signal processor 110 or the output signal from host computer 2.

The output signal from multiplexer 120 is applied to RGB signal processor 130 and microcomputer 140. Also, the output signal from multiplexer 120 is transferred to sub monitor 200 through an output terminal 106 of main monitor 100 and an input terminal 205 of sub monitor 200.

Similarly, an output signal from a multiplexer 220 in sub monitor 200 is transferred to an input terminal 305 of subsequent sub monitor 300. In this manner, N sub monitors are connected in series to main monitor 100 so that the same video signal can be displayed on the screens thereof.

On the other hand, the monitor power off state is not a complete off state but a suspend state. For this reason, the minimum operation power is applied to microcomputer 140 in main monitor 100. Upon receiving a power control signal from function key input unit 20, microcomputer 140 controls power supply circuit 170 to control the entire power of the main monitor 100. At his time, the power states of all sub monitors 200, . . . , N are the suspend state.

Whereas the video signal is transferred to the sub monitors as mentioned above, microcomputer 140 in main monitor 100 selects a desired one of the sub monitors in response to the sub monitor control key signal from function key input unit 20 and transfers the corresponding control data to communication device 280 in sub monitor 200 through communication device 180.

Upon receiving the control data from main monitor 100 through communication device 280, microcomputer 240 checks whether the received control data is for the control of sub monitor 200. The microcomputer 240 transfers the response data to main monitor 100 or the received control data to subsequent sub monitor 300 in accordance with the checked result. In this manner, the data transfer is performed between main monitor 100 and the sub monitors.

The data transfer between main and sub monitors 100 and 200 will hereinafter be described with reference to FIG. 5.

For example, in the case where main monitor 100 outputs a logical value "0" to input terminal 198 of communication device 280, transistor 196 in second buffer 191 is turned off, thereby causing a voltage of 5V from the supply voltage terminal to be applied to the input terminal of microcomputer 240.

Then, microcomputer 240 recognizes the control data from main monitor 100 and thus outputs a logical value "1" to communication device 280 at its output terminal, thereby causing transistor 183 in first buffer 181 to be turned off. As transistor 183 in first buffer 181 is turned off, the logical value "0" is outputted through output terminal 188 of connector 290 to the communication device in sub monitor 300. As a result, the output logical value "0" from main monitor 100 is transferred to the microcomputer in sub monitor 300 through the communication device in sub monitor 300.

Then, the transfer of the response data from the sub monitor to the main monitor is performed in a similar manner to that mentioned above.

In this manner, the main monitor 100 can individually control the sub monitors in the conference place using the communication devices.

FIG. 7 is a table illustrating functions of the sub monitors controllable by main monitor 100. As shown in this drawing, the control functions of the sub monitors are classified into general, color, audio and power control functions.

The general control function is to control degaussing, side-pin, trap, horizontal synchronous signal phase H-PHASE, vertical synchronous signal line V-LINE, vertical synchronous signal center V-CENTER, horizontal synchronous signal size H-SIZE and S-correction S-CORRECT.

The color control function is to control RGB gains R-GAIN, G-GAIN and B-GAIN, RGB cutoff R-CUTOFF, G-CUTOFF and B-CUTOFF, contrast and bright.

The audio control function is to control main volume MAIN-VR, balance, bass, treble and mute.

The power control function is to control power-on/off, power-standby and power-suspend.

As mentioned above, because the sub monitors have the communication functions, they can be controlled by main monitor 100 under the control of the operator.

FIG. 6 is a flowchart illustrating a method for controlling a plurality of sub monitors in a video communication system using main monitor 100 in accordance with the present invention.

For example, assume that main monitor 100 will control the power of sub monitor 200 and the brightness of another sub monitor 400. First, when main monitor 100 is powered on at step S110, general function and sub monitor control messages are displayed on the screen of main monitor 100. In this case, microcomputer 140 in main monitor 100 selects the sub monitor control message on the screen of main monitor 100 under the control of the operator using function key input unit 20 at step S120.

Then, microcomputer 140 in main monitor 100 automatically detects the arranged states of sub monitors 200, . . . , detected s communication devices 180, 280, . . . at step S130 and displays the detected states on the screen of main monitor 100 at step S140. The microcomputer 140 selects a desired one (for example, 200) of sub monitors 200, . . . , N displayed on the screen of main monitor 100 under the control of the operator using function key input unit 20 at step S150. Then, the control functions of the selected sub monitor 200 as shown in FIG. 7 are displayed on the screen of main monitor 100. In the case where a power control function is selected among the displayed functions, the current power state of the selected sub monitor 200 is displayed on the screen of main monitor 100 at step S160. Then, microcomputer 140 transfers control data to sub monitor 200 through communication device 180 at step S170 to power on sub monitor 200. The communication device 280 in sub monitor 200 receives the control data from main monitor 100 and transfers the received control data to microcomputer 240 in sub monitor 200.

Upon receiving the control data from main monitor 100, microcomputer 240 in sub monitor 200 checks at step S210 whether the received control data is for the control of sub monitor 200. In the case where it is checked at the above step S2 10 that the received control data is for the control of sub monitor 200, microcomputer 240 transfers the response data to main monitor 100 through communication devices 280 and 180. Then, microcomputer 140 in main monitor 100 displays the response data from microcomputer 240 on the screen of main monitor 100.

On the other hand, if it is checked at the above step S2 10 that the received control data is not for the control of sub monitor 200, microcomputer 240 transfers the received control data to subsequent sub monitor 300 through communication device 280 at step S250.

The operator checks the power state of sub monitor 200 on an on-screen display (OSD) and selects the power-on state of sub monitor 200 using function key input unit 20. Thus, microcomputer 140 in main monitor 100 transfers control data corresponding to the power-on state to communication device 280 of sub monitor 200 through communication device 180 in main monitor 100 at step S170. The communication device 280 outputs the received control data to microcomputer 240 in sub monitor 200. Then, microcomputer 240 checks at step S220 whether the received control data is different from set-up data. If it is checked at the above step S220 that the received control data is different from the set-up data, microcomputer 240 controls power supply circuit 270 in sub monitor 200 according to the received control data at step S230 to power on sub monitor 200.

After controlling the power-on function of sub monitor 200, microcomputer 140 in main monitor 100 checks at step S240 whether another sub monitor to be controlled is present. In the case where it is checked at the above step S240 that the brightness of sub monitor 400 is to be controlled, microcomputer 140 in main monitor 100 selects sub monitor 400 under the control of the operator using function key input unit 20 at step S150.

The brightness of sub monitor 400 is controlled in the same manner as the power of sub monitor 200. Namely, if the opera or selects sub monitor 400 on the screen of main monitor 100, control functions of selected sub monitor 400 are displayed on the screen of main monitor 100 at step S160. Then, the operator selects a brightness control function among the displayed functions to raise or lower the brightness of sub monitor 400. The microcomputer 140 in main monitor 100 transfers the corresponding control data to microcomputer 240 in sub monitor 200 through communication devices 180 and 280 at step S170. Upon receiving the control data from main monitor 100, microcomputer 240 checks at step S210 whether the received control data is for the control of sub monitor 200. If it is checked at the above step S210 that the received control data is not for the control of sub monitor 200, microcomputer 240 transfers the received control data to the communication device of subsequent sub monitor 300 through communication device 280 at step S250. In this manner, the control data from main monitor 100 is transferred to the microcomputer of sub monitor 400, which then sets up sub monitor 400 again according to the received control data.

In the case where microcomputer 140 in main monitor 100 does not select the sub monitor control message on the screen of main monitor 100 at step S120 or checks at step S240 that another sub monitor to be controlled is not present, it performs the general function at step S300. Noticeably, main monitor 100 displays the arranged states, functions and associated data of the sub monitors in an OSD manner. The sub monitors are automatically detected or set to their inherent numbers for the check on the arranged states thereof.

Control reference values of the sub monitors are previously set in a manufacturing process. When the operator selects a desired one of the sub monitors and a control function thereof, the control reference values are displayed on the screen of the main monitor. The operator checks the displayed control reference values and selects a desired one of them. Then, the operator applies the selected value to the microcomputer in the main monitor using the function key input unit to control the selected sub monitor.

In this manner, the main monitor can control all the sub monitors connected in series thereto.

As apparent from the above description, according to the present invention, the main monitor can control the plurality of sub monitors using the communication devices therein and the program for the control thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling a plurality of sub monitors in a video communication system in which the same signal from a host computer or a video tape recording/reproducing device is displayed on screens of said sub monitors and a main monitor to which said sub monitors are connected in series, comprising:

a function key input unit for generating at least one sub monitor control signal to set up a desired one of said sub monitors said main monitor generating control data in response to said at least one sub monitor control signal;

a plurality of communication means included respectively in said main monitor and said sub monitors, for serially transferring said control data from said main monitor to said sub monitors and response data generated by said sub monitors from said sub monitors to said main monitor; and a plurality of microcomputers provided respectively to said sub monitors and connected respectively to said communication means, for setting up a corresponding one of said sub monitors in response to said control data from said main monitor when said control data from said main monitor is for the control of the corresponding sub monitor and transferring said control data from said main monitor to a subsequent sub monitor when said control data from said main monitor is not for the control of the corresponding sub monitor, wherein each of said communication means comprises:

first buffering means for transferring said response data or said control data from a corresponding one of said microcomputers to said main monitor or said subsequent sub monitor;

second buffering means for transferring said control data from said main monitor or said response data from said subsequent sub monitor to said corresponding microcomputer; and a connector having an output terminal for transferring said response data or said control data from said first buffering means to said main monitor or said subsequent sub monitor, and an input terminal for transferring said control data from said main monitor or said response data from said subsequent sub monitor to said second buffering means.

2. An apparatus for controlling a plurality of sub monitors in a video communication system in which the same signal from a host computer or a video tape recording/reproducing device is displayed on screens of said sub monitors and a main monitor to which said sub monitors are connected in series, comprising:

a function key input unit for generating at least one sub monitor control signal to set up a desired one of said sub monitors said main monitor generating control data in response to said at least one sub monitor control signal;

a plurality of communication means included respectively in main monitor and said sub monitors, for serially transferring said control data from said main monitor to said sub monitors and response data generated by said sub monitors from said sub monitors to said main monitor; and a plurality of microcomputers connected respectively to said communication means, for setting up a corresponding one of said sub monitors in response to said control data from said main monitor when said control data from said main monitor is for the control of the corresponding sub monitor and transferring said control data from said main monitor to a subsequent sub monitor when said control data from said main monitor is not for the control of the corresponding sub monitor, wherein each of said communication means comprises:

first buffering means for transferring said response data or said control data from a corresponding one of said microcomputers to said main monitor or said subsequent sub monitor;

second buffering means for transferring said control data from said main monitor or said response data from said subsequent sub monitor to said corresponding microcomputer; and a connector having an output terminal for transferring said response data or said control data from said first buffering means to said main monitor or said subsequent sub monitor, and an input terminal for transferring said control data from said main monitor or said response data from said subsequent sub monitor to said second buffering means, wherein said first buffering means comprises:

a first resistor having one side connected to an output terminal of said corresponding microcomputer;

a second resistor having one side connected to a ground voltage terminal;

a third resistor having one side connected to said output terminal of said connector;

a current amplification transistor having a base connected to another side of said first resistor, an emitter connected to a supply voltage terminal and a collector connected in common to other sides of said second and third resistors;

a first bias/transistor protection diode having an anode connected to a connection point of said one side of said third resistor and said output terminal of said connector and a cathode connected to a connection point of said supply voltage terminal and said emitter of said transistor; and a second bias/transistor protection diode having an anode connected to said ground voltage terminal and a cathode connected to said connection point of said one side of said third resistor and said output terminal of said connector.

3. An apparatus for controlling a plurality of sub monitors in a video communication system in which the same signal from a host computer or a video tape recording/reproducing device is displayed on screens of said sub monitors and a main monitor to which said sub monitors are connected in series, comprising:

a function key input unit for generating at least one sub monitor control signal to set up a desired one of said sub monitors said main monitor generating control data in response to said at least one sub monitor control signal;

a plurality of communication means included respectively in main monitor and said sub monitors, for serially transferring said control data from said main monitor to said sub monitors and response data generated by said sub monitors from said sub monitors to said main monitor; and a plurality of microcomputers provided respectively to said sub monitors and connected respectively to said communication means, for setting up a corresponding one of said sub monitors in response to said control data from said main monitor when said control data from said main monitor is for the control of the corresponding sub monitor and transferring said control data from said main monitor to a subsequent sub monitor when said control data from said main monitor is not for the control of the corresponding sub monitor, wherein each of said communication means comprises:

first buffering means for transferring said response data or said control data from a corresponding one of said microcomputers to said main monitor or said subsequent sub monitor;

second buffering means for transferring said control data from said main monitor or said response data from said subsequent sub monitor to said corresponding microcomputer; and a connector having an output terminal for transferring said response data or said control data from said first buffering means to said main monitor or said subsequent sub monitor, and an input terminal for transferring said control data from said main monitor or said response data from said subsequent sub monitor to said second buffering means, wherein said second buffering means comprises:

a first resistor having one side connected to a supply voltage terminal;

a second resistor having one side connected to said input terminal of said connector;

a third resistor having one side connected to a ground voltage terminal;

a current amplification transistor having a base connected in common to other sides of said second and third resistors, an emitter connected to said ground voltage terminal and a collector connected in common to another side of said first resistor and an input terminal of said corresponding microcomputer;

a first bias/transistor protection diode having an anode connected to a connection point of said input terminal of said connector and said one side of said second resistor and a cathode connected to a connection point of said supply voltage terminal and said collector of said transistor; and a second bias/transistor protection diode having an anode connected to said ground voltage terminal and a cathode connected to said connection point of said input terminal of said connector and said one side of said second resistor.

4. A method for controlling a plurality of sub monitors in a video communication system utilizing a host computer or a video tape recording/reproducing device connected to a main monitor, said main monitor being connected in series to said sub monitors, said method comprising the steps of:

powering up said main monitor in response to a power control signal input from a function key input unit activated by a user;

displaying a general function message and sub monitor control messages on a screen of said main monitor upon said powering up of said main monitor;

selecting, utilizing said function key input unit, one of said sub monitor control messages;

detecting, and displaying on said screen of said main monitor, current states of each of said sub monitors in response to the selection of said sub monitor control message;

selecting one of said sub monitors to be controlled;

displaying, on said screen of said main monitor, control functions for the selected sub monitor;

selecting one of said control functions and transmitting corresponding control data to the selected sub monitor;

determining, at said selected sub monitor, whether said control data is for said selected sub monitor;

determining, at said selected sub monitor, whether said control data is different from set-up data of said selected sub monitor after determining said control data is for said selected sub monitor;

setting up said selected sub monitor according to said control data when it is determined that said control data is different from set-up data of said selected sub monitor;

determining whether another of said sub monitors is to be controlled by said host computer when it is determined that said control data is not different from said set-up data of said selected sub monitor or after completing said setting up step;

returning to said step of selecting one of said sub monitors to be controlled to select another one of said sub monitors when it is determined that another of said sub monitors is to be controlled.

5. The method as set forth in claim 4, wherein said step of transmitting corresponding control data to the selected sub monitor comprises serially transmitting said control data to a microcomputer of said selected sub monitor from a microcomputer of said main monitor via microcomputers of any sub monitors serially connected between said main monitor and said selected sub monitor.

6. The method as set forth in claim 5, wherein said step of transmitting said control data to the selected sub monitor comprises the steps of:

transmitting said control data from said main monitor to a first one of said serially connected sub monitors;

determining, at said first one of said sub monitors, whether said control data is for said first one of said sub monitors;

transferring said control data to a subsequent sub monitor when it is determined in said first one of said sub monitors that said control data is not for said first one of said sub monitors;

checking at said subsequent sub monitor whether said control data is for said subsequent sub monitor; and repeating said steps of transferring said control data to a subsequent sub monitor and checking at said subsequent sub monitor until said step of checking at said subsequent sub monitor results in determining said control data is for said selected sub monitor.

7. A method for controlling a plurality of sub monitors in a video communication system utilizing a host computer or a video tape recording/reproducing device connected to a main monitor, said main monitor being connected in series to said sub monitors, said method comprising the steps of:

powering up said main monitor in response to a power control signal input from a function key input unit activated by a user;

displaying a general function message and sub monitor control messages on a screen of said main monitor upon said powering up of said main monitor;

selecting, utilizing said function key input unit, one of said sub monitor control messages;

detecting, and displaying on said screen of said main monitor, current states of each of said sub monitors in response to the selection of said sub monitor control message;

selecting one of said sub monitors to be controlled;

displaying, on said screen of said main monitor, control functions for the selected sub monitor;

selecting one of said control functions for said selected sub monitor;

displaying a current state of said selected sub monitor corresponding to said selected control function of said selected sub monitor;

generating control data by changing data of the displayed current state;

transmitting said control data to the selected sub monitor;

determining, at said selected sub monitor, whether said control data is for said selected sub monitor;

determining, at said selected sub monitor, whether said control data is different from set-up data of said selected sub monitor after determining said control data is for said selected sub monitor;

setting up said selected sub monitor according to said control data when it is determined that said control data is different from set-up data of said selected sub monitor;

determining whether another of said sub monitors is to be controlled by said host computer when it is determined that said control data is not different from said set-up data of said selected sub monitor or after completing said setting up step;

returning to said step of selecting one of said sub monitors to be controlled to select another one of said sub monitors when it is determined that another of said sub monitors is to be controlled.

8. The method as set forth in claim 7, wherein said step of transmitting said control data to the selected sub monitor comprises the steps of:

transmitting said control data from said main monitor to a first one of said serially connected sub monitors;

determining, at said first one of said sub monitors, whether said control data is for said first one of said sub monitors;

transferring said control data to a subsequent sub monitor when it is determined in said first one of said sub monitors that said control data is not for said first one of said sub monitors;

checking at said subsequent sub monitor whether said control data is for said subsequent sub monitor; and repeating said steps of transferring said control data to a subsequent sub monitor and checking at said subsequent sub monitor until said step of checking at said subsequent sub monitor results in determining said control data is for said selected sub monitor.

9. The method as set forth in claim 7, further comprising the steps of:

transmitting response data to said main monitor from said selected sub monitor after determining said control data is for said selected sub monitor; and displaying said response data on said screen of said main monitor.

10. The method as set forth in claim 7, wherein said step of transmitting corresponding control data to the selected sub monitor comprises serially transmitting said control data to a microcomputer of said selected sub monitor from a microcomputer of said main monitor via microcomputers of any of said sub monitors serially connected between said main monitor and said selected sub monitor.

11. The method as set forth in claim 8, wherein said step of transmitting corresponding control data to the selected sub monitor comprises serially transmitting said control data to a microcomputer of said selected sub monitor from a microcomputer of said main monitor via microcomputers of any of said sub monitors serially connected between said main monitor and said selected sub monitor.

12. A monitoring system having a plurality of sub monitors in a video communication system in which the same signal from a host computer or a video tape recording/reproducing device is displayed on screens of said sub monitors and a main monitor to which said sub monitors are connected in series, comprising:

a function key input unit for generating at least one sub monitor control signal to set up a desired one of said sub monitors said main monitor generating control data in response to said at least one sub monitor control signal;

a plurality of communication means included respectively in main monitor and said sub monitors, for serially transferring said control data from said main monitor to said sub monitors and response data generated by said sub monitors from said sub monitors to said main monitor; and a plurality of microcomputers provided respectively to said sub monitors and connected respectively to said communication means, for setting up a corresponding one of said sub monitors in response to said control data from said main monitor when said control data from said main monitor is for the control of the corresponding sub monitor and transferring said control data from said main monitor to a subsequent sub monitor when said control data from said main monitor is not for the control of the corresponding sub monitor;

said communication means further comprising:

first buffering means for transferring said response data or said control data from a corresponding one of said microcomputers to said main monitor or said subsequent sub monitor;

second buffering means for transferring said control data from said main monitor or said response data from said subsequent sub monitor to said corresponding microcomputer; and a connector having an output terminal for transferring said response data or said control data from said first buffering means to said main monitor or said subsequent sub monitor, and an input terminal for transferring said control data from said main monitor or said response data from said subsequent sub monitor to said second buffering means.

* * * * *